United States Patent
Hopper

(10) Patent No.: US 8,081,494 B2
(45) Date of Patent: Dec. 20, 2011

(54) FULLY INTEGRATED MULTI-PHASE GRID-TIE INVERTER

(75) Inventor: Peter J. Hopper, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 447 days.

(21) Appl. No.: 12/315,932

(22) Filed: Dec. 8, 2008

(65) Prior Publication Data

US 2010/0142239 A1    Jun. 10, 2010

(51) Int. Cl.
*H02M 3/335* (2006.01)
*H02M 1/12* (2006.01)

(52) U.S. Cl. ............. 363/17; 363/40; 363/41; 363/98; 363/132; 363/134

(58) Field of Classification Search ............ 363/17, 363/40, 41, 98, 132, 134
See application file for complete search history.

(56) References Cited

U.S. PATENT DOCUMENTS

| | | | | |
|---|---|---|---|---|
| 4,742,441 A * | 5/1988 | Akerson | | 363/97 |
| 5,155,672 A * | 10/1992 | Brown | | 363/43 |
| 5,373,195 A * | 12/1994 | De Doncker et al. | | 307/45 |
| 6,021,052 A * | 2/2000 | Unger et al. | | 363/26 |
| 6,583,996 B2 * | 6/2003 | Deng et al. | | 363/40 |
| 6,603,672 B1 * | 8/2003 | Deng et al. | | 363/37 |
| 6,940,735 B2 * | 9/2005 | Deng et al. | | 363/37 |
| 7,046,527 B2 * | 5/2006 | West | | 363/41 |
| 2005/0105306 A1* | 5/2005 | Deng et al. | | 363/37 |

* cited by examiner

*Primary Examiner* — Bao Q Vu
(74) *Attorney, Agent, or Firm* — Jurgen K. Vollrath; Vollrath & Associates

(57) ABSTRACT

In a grid-tie inverter, the DC input is phase and pulse-width modulated to define multiple phase shifted voltage pulses with the width of each pulse being modulated according to the grid AC amplitude for the corresponding portion of the AC phase.

11 Claims, 3 Drawing Sheets

FULLY INTEGRATED MULTI-PHASE GRID-TIE INVERTER

FIELD OF THE INVENTION

The invention relates to the conversion of electrical power. In particular it relates to grid-tie inverters for synchronizing an electrical energy source with the national grid.

BACKGROUND OF THE INVENTION

With the effects of global warming becoming increasingly evident the need for alternative, renewable energy sources is becoming ever more acute. Much research has gone into wind, solar, and geothermal energy sources with the result that the cost of wind power per kilowatt hour has come down to the point where it is essentially on a par with energy from oil and is in fact cheaper than nuclear energy. Even the relatively high cost of solar energy is starting to see substantial price improvements.

However, the cost advantage with respect to wind and solar energy is somewhat eroded when looking at small scale energy production. This can best be explained by noting that there are two components to providing the energy to the consumer: the first is the cost to produce the energy, and the second is the synchronizing of the energy to the grid. For instance in the case of large scale wind energy (1.3 MW and more) the cost to produce is approximately $0.5/Watt and the cost to synchronize to the grid is also about $0.5/Watt. In contrast, in the case of small scale wind energy production (up to about 500 W), e.g. using smaller windmills instead of large wind generators, the cost of production is about twice as much (about $1/Watt) and for photovoltaic (PV) modules it is $2.30 to $3.50/W. In addition, the cost of synchronizing to the grid is significantly higher at about $3.2/Watt. Thus small scale wind and solar energy is currently cost prohibitive due to the cost of converting the DC from the windmill or wind turbine, or from the solar panels, to AC that is synchronized with the grid.

The reason for this high cost is the cost of grid tie inverters. Currently one of the cheaper grid tie inverters is the Sunny-Boy, made by SMA, which carries a price tag of about $1700 for 700 Watt.

In the past a large number of photovoltaic (PV) cells were interfaced with a central inverter in order to achieve the desired voltage and current. This however requires high voltage dc cables. GTI address this issue by making use of an integrated AC module that integrates a single photovoltaic (PV) cell 100 and inverter 102 into one electrical device thereby avoiding mismatch losses between PV cells. Its modular structure thus simplifies enlargement of the system by providing a simple plug-and-play solution. As shown in FIG. 1, each module comprises a DC to AC inverter 102 that makes use of IGBTs or MOSFETs.

However, another cost factor is the use of large transformers with large coils. For instance, in order to boost 24V DC to 110V AC at a frequency of 50 Hz, V=L dI/dt tells us that for (110-24)V and di/dt=50 Hz the inductance of the coils has to be about 2 Henrys, thus requiring extremely large and expensive copper coils. One approach to solving this issue has been the use of high frequency transformers, which allows the use of printed circuit board magnetic components.

One such prior art module is shown in FIG. 2, which shows a PV cell 200 connected to a high frequency transformer 202 with a large capacitor 204 in parallel with the PV cell 200. The secondary winding of the transformer 202 is connected to a diode bridge 210 to convert the high frequency AC back to DC. A large solenoid 212 provides smoothing of the DC output before switching the DC to the grid frequency using switchers 214. It will be appreciated that the diodes of the bridge 210 have to handle large currents and voltages and therefore are large power devices, as are the power switching transistors 214. Also, since the transformer 202 has to handle large amplitudes albeit at high frequencies it adds substantial core losses due to hysteresis in the core.

The present invention seeks to address some of these issues.

SUMMARY OF THE INVENTION

According to the invention there is provided a method of synchronizing a DC input signal to an AC signal, comprising phase-and-amplitude modulating the DC signal to define multiple phase-shifted high frequency signal pulses that each define a portion of an AC voltage envelope that has a frequency corresponding to the frequency of the AC signal, and combining the multiple high frequency signals to define an AC output signal. The multiple phase-shifted high frequency signals may be formed by feeding the DC signal through an array of switching transistors and sequentially switching the switching transistors. The sequence of switching the switching transistors may be controlled to provide a voltage pulse from each transistor that is phase shifted relative to the other transistors and has a pulse width to define a portion of the AC voltage envelope. The phase of each switching transistor pulse may correspond to a phase of the AC voltage envelope, and the pulse width of each switching transistor may be related to the amplitude of the AC voltage envelope for the corresponding phase. The grid phase and the pulse phase of each coil element in the coil array may be monitored using an on-chip ferro-magnetically isolated current sensor (flux gate). The AC signal typically has a frequency corresponding to a grid frequency and preferably the synchronizing of the DC input signal to the mains AC signal is done using only integrated structures.

Further, according to the invention, there is provided a grid-tie inverter for synchronizing a DC input signal to a grid AC signal, comprising an array of switching transistors connected to the DC input, and a controller for controlling the control electrodes of the switching transistors to define voltage pulses that are phase shifted relative to each other the, pulse-widths being modulated according to the grid AC signal amplitude. To achieve this, the grid-tie inverter may further comprise a ferro-magnetically isolated current sensor (flux gate) to monitor the phase of the grid AC and the pulse phases. The AC signals may have a frequency that is 100,000 to 1000,000 times as high as the mains AC frequency. The grid tie inverter may be integrated on one or more chips.

DETAILED DESCRIPTION OF THE INVENTION

The present invention proposes an entirely different approach to converting the DC supply to an AC supply suitable for synchronizing with the national grid at 110V, 50 Hz.

The present invention proposes doing away with the large inductor coils. In particular, the present invention increases the switching speed substantially, e.g., a million times to achieve a corresponding reduction in the inductor size. Thus, for example if dI/dt=50 MHz, and V changes from 24V to 110 V for a delta V of 86V the inductance L in the equation Delta V=Ldi/dt is reduced by 1 million times to about 2.2 μH. In one embodiment cheap inductors are formed on a semiconductor chip using photolithographic and etching techniques While the prior art shown in FIG. 2 also makes use of high frequencies to improve inductor efficiency it is left with the disadvantage of having to provide rectifying diodes to convert back to DC and robust power transistors to then convert the DC to the grid frequency (50 Hz in the US, 60 Hz in Europe)

Figure 3:
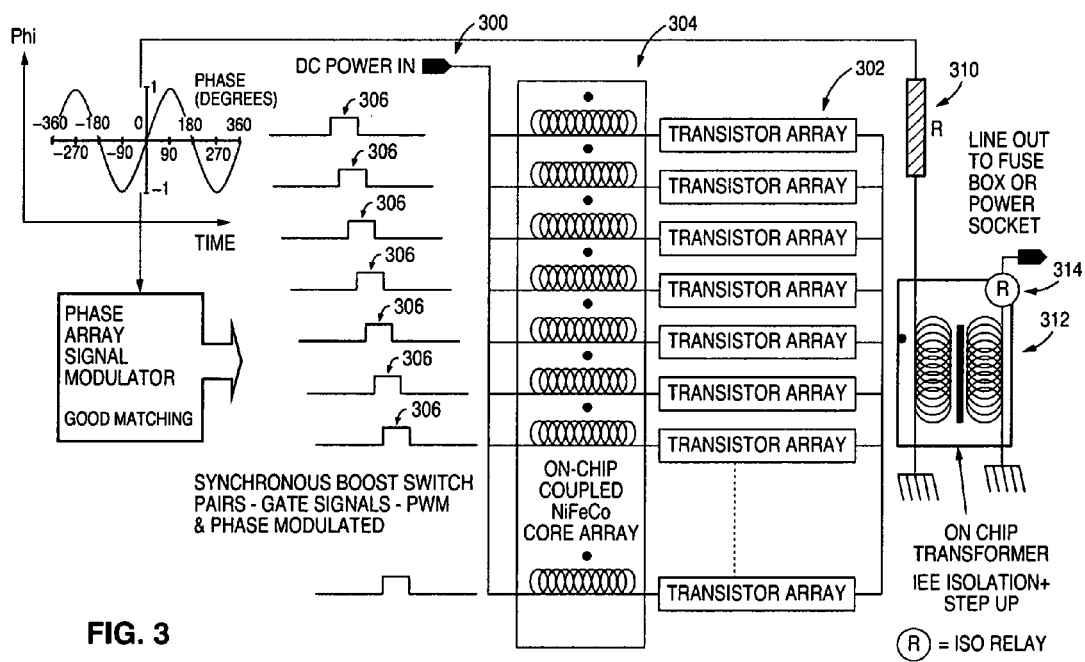
FIG. 3 is a simple representation of one embodiment of part of the system of the invention.

The present invention proposes instead to convert the DC 300 (FIG. 3) from the wind generator or photovoltaic (PV) cell to high frequency AC by making use of a transistor array 302. The control gates of the switching transistors in the array 302 are sequentially controlled to turn each of the transistors on in turn for a defined period to define a voltage pulse 306. Each of the transistors is connected to a solenoid or coil in a coil array 304 to cause a voltage pulse over the coil as the corresponding transistor turns on. In one embodiment the coil array 304 is a NiFeCo core array. The coils of the array 304 are coupled to a common core to define the primary winding of a transformer, the secondary winding of which is not shown but takes the energy to the output stage by being connected to the grid through a resistor 310, an on-chip isolation transformer 312, and an isolation relay 314.

In order to provide the grid frequency on the isolation transformer 312 the sequential switching of the transistors in the array 302 is pulse width and phase modulated to an AC envelope at the grid frequency (50 Hz to comply with the US grid requirements). It will be appreciated that 50 Hz is used here by way of example only and that regional differences will require different grid voltages and frequencies such as the 220V, 60 Hz used in Europe.

In this embodiment the array of small inductors define a multi-phased array and the phase differences across the array are modulated by a 50 Hz grid sampled signal. An on-chip ferro-magnetically isolated current sensor (flux gate) is used in this embodiment to sense the grid phase and the voltage phase of each coil element in the coil array 304. This is best understood by considering an array of 18 switching transistors and 18 coils, the transistors being switched on and off to define a 50 Hz voltage waveform. Thus to achieve the 360° sinusoidal waveform each of the transistors has to provide 20° of the sinusoid. In particular the DC input signal is modulated in the time domain to define between 26° and 46° of the sinusoid in the frequency domain for each switching transistor. Thus the sequence of switching the switching transistors is controlled to provide a voltage pulse from each transistor that is phase shifted relative to the other transistors and has a pulse width to define a portion of the AC voltage envelope. In particular the phase of each switching transistor pulse corresponds to a phase of the AC voltage envelope, and the pulse width of each switching transistor is related to the amplitude of the AC voltage envelope for the corresponding phase. For purposes of this discussion the use of the term phase to define the switching of each switching transistor refers in the frequency domain to the portion (in this case 20°) of the 360° sinusoidal waveform during which the transistor is switched on, and in the time domain the duration for which the transistor is switched on during every 1/50 second interval of a 50 Hz grid cycle.

In practice a much larger transistor array and coil array is used than just 18 switching transistors and 18 coils, in order to greatly increase the frequency and reduce the size of the coils in the array.

One advantage of the present invention is that the large number of line transistors of the array 302 share the total power and can thus be lower voltage transistors. This contrasts with the prior art circuit of FIG. 2 in which switching transistors 214 switch the full DC voltage coming from the rectifier bridge 210 at the grid frequency.

Figure 1:
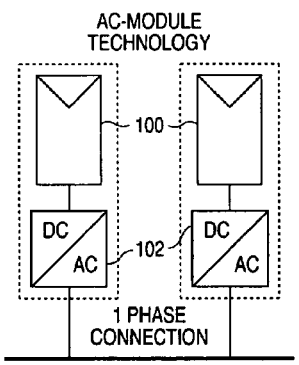
FIG. 1 is a simple block diagram of a prior art integrated photovoltaic cell and inverter module.
Figure 2:
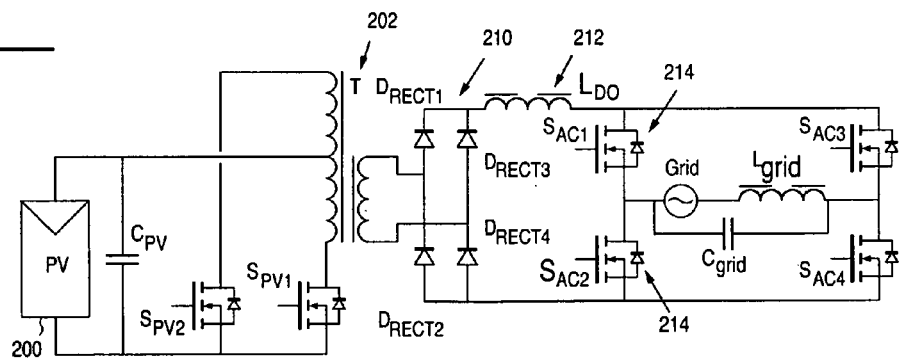
FIG. 2 is a circuit diagram of a prior art photovoltaic cell and inverter making use of a high frequency transformer.

Another advantage of the present invention is that it does not convert high frequency AC to DC first, and thus avoids the need for rectifying diodes such as the diode bridge 210 of the prior art circuit in FIG. 2.

Yet another advantage of the present invention is that by making use of a multi-phase system as described in this application, the amplitude of the voltage through each solenoid is small, thereby keeping the magnetic energy ripple in the core of the array 304 low, which reduces the hysteresis losses in the core.

Since all of the elements in the inverter circuit can be integrated on a chip estimates have shown that the invention can reduce the cost of synchronizing to the grid to about $0.05/Watt (Peter please confirm that it is 0.05 dollars not 0.05 cents) compared to the approximate $2/Watt currently provided today using conventional grid tie inverters.

Figure 4:
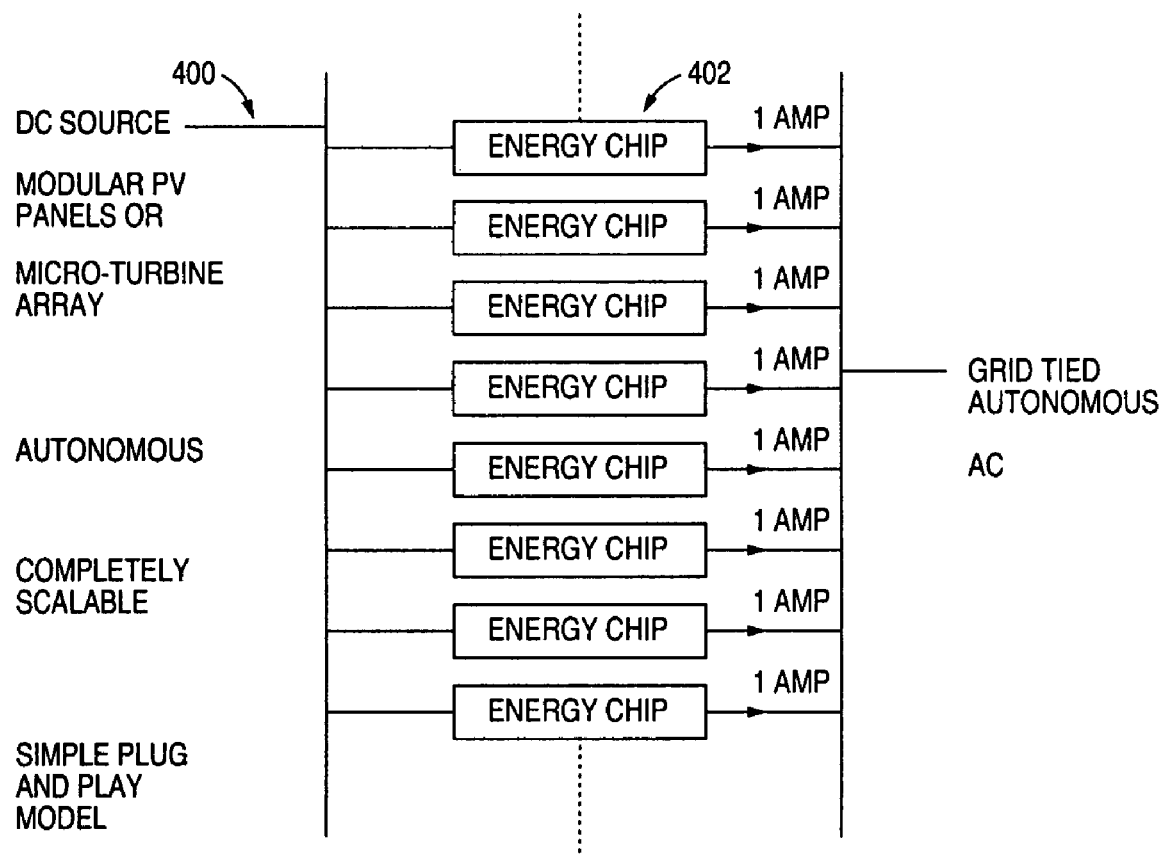
FIG. 4 shows the connection of multiple systems of the invention in parallel.

In the example given above example a single solar panel or windmill provided 100 W DC output at 24V, 4 A and was converted to 100 W grid tied AC at 110V and about 1 A. In order to provide greater power needs, the present invention lends itself to connecting several of these systems in parallel to achieve the requisite current, as shown in FIG. 4. For ease of reference, the system of the invention discussed above will be referred to as an energy chip since the functionality is entirely integrated on one or more chips. The DC input 400 from each of the solar panels or wind turbines is fed into an energy chip 402 to produce a 1 A output at 50 Hz and 110V. By connecting the outputs from several of these power chips 402 in parallel as shown in FIG. 4, a high current output (related to the number of power chips in parallel) is achieved, thereby providing cost-effective grid-tied AC.

While the discussion above focused on solar panels and windmills or micro-turbines, it will be appreciated that the invention could also be used for other energy sources, including high power energy sources for tying to the mains or national grid. The invention was described with respect to specific voltage and current inputs and voltage, current, and frequency outputs and with respect to a specific frequency for the high frequency signals, however, these were given by way of example only and the invention is not limited to these in any way.

What is claimed is:

1. A method of synchronizing a DC input signal to an AC signal, comprising
   phase-and-amplitude modulating the DC signal to define multiple phase-shifted high frequency signal pulses that each define a portion of an AC voltage envelope that has a frequency corresponding to the frequency of the AC signal, and
   combining the multiple high frequency signals to define an AC output signal.

2. A method of claim 1, wherein the multiple phase-shifted high frequency signals are formed by feeding the DC signal through an array of switching transistors and sequentially switching the switching transistors.

3. A method of claim 2, wherein the sequence of switching the switching transistors is controlled to provide a voltage pulse from each transistor that is phase shifted relative to the other transistors and has a pulse width to define a portion of the AC voltage envelope.

4. A method of claim 3, wherein the phase of each switching transistor pulse corresponds to a phase of the AC voltage envelope, and the pulse width of each switching transistor is related to the amplitude of the AC voltage envelope for the corresponding phase.

5. A method of claim 4, wherein the grid phase and the pulse phase of each coil element in the coil array is monitored using an on-chip ferro-magnetically isolated current sensor (flux gate).

6. A method of claim 1, wherein the AC signal has a frequency corresponding to a grid frequency.

7. A method of claim 1, further comprising performing the synchronizing of the DC input signal to the mains AC signal using only integrated structures.

8. A grid-tie inverter for synchronizing a DC input signal to a grid AC signal, comprising an array of switching transistors connected to the DC input, and a controller for controlling the control electrodes of the switching transistors to define voltage pulses that are phase shifted relative to each other the pulse-widths being modulated according to the grid AC signal amplitude.

9. A grid-tie inverter of claim 8, further comprising a ferromagnetically isolated current sensor (flux gate) to monitor the phase of the grid AC and the pulse phases.

10. A grid-tie inverter of claim 8, wherein the AC signals have a frequency that is 100,000 to 1000,000 times as high as the mains AC frequency.

11. A grid-tie inverter of claim 8, wherein the grid tie inverter is integrated on one or more chips.

\* \* \* \* \*